Figure 1:
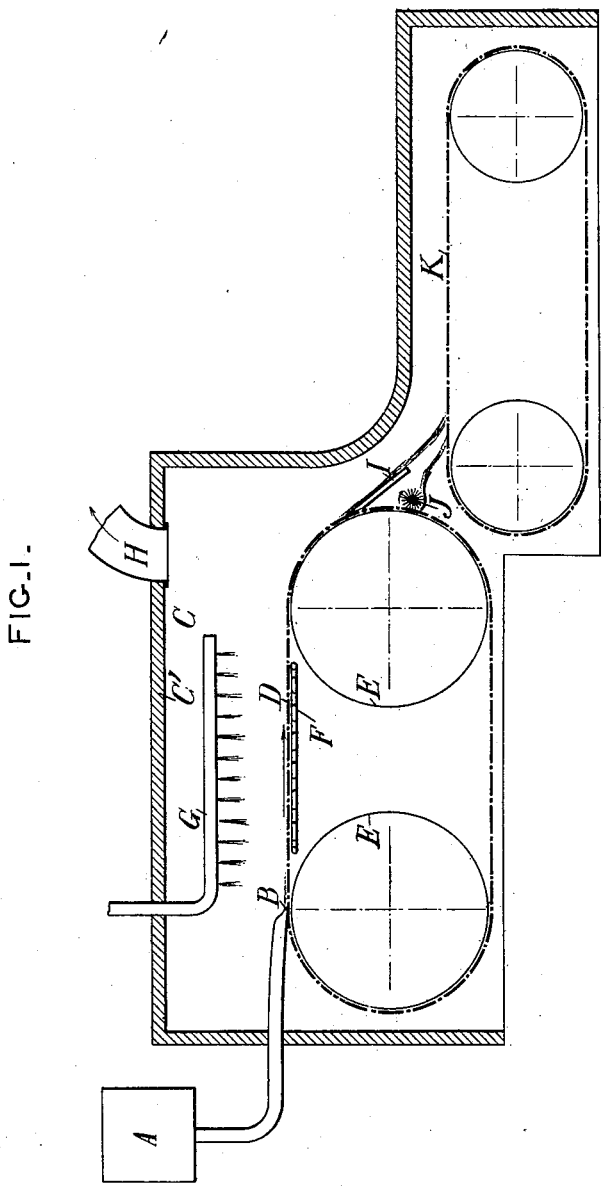

No. 732,234. PATENTED JUNE 30, 1903.
C. G. SUDRE & C. V. THIERRY.
PROCESS OF TREATING DISTILLERS' WASH.
APPLICATION FILED AUG. 29, 1900.
NO MODEL. 2 SHEETS—SHEET 1.

No. 732,234. PATENTED JUNE 30, 1903.
C. G. SUDRE & C. V. THIERRY.
PROCESS OF TREATING DISTILLERS' WASH.
APPLICATION FILED AUG. 29, 1900.
NO MODEL. 2 SHEETS—SHEET 2.
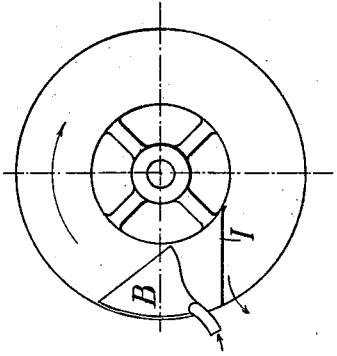
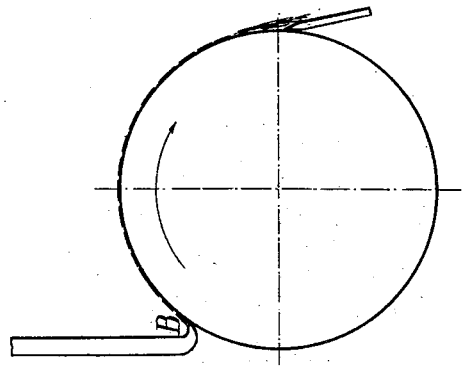
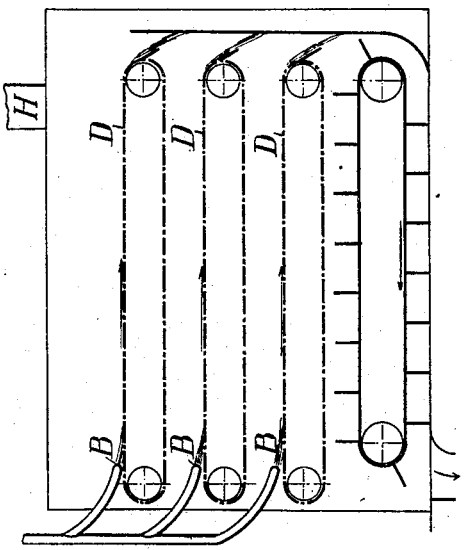

No. 732,234. Patented June 30, 1903.

UNITED STATES PATENT OFFICE.

CHARLES GABRIEL SUDRE AND CHARLES VICTOR THIERRY, OF PARIS, FRANCE.

PROCESS OF TREATING DISTILLERS' WASH.

SPECIFICATION forming part of Letters Patent No. 732,234, dated June 30, 1903.

Application filed August 29, 1900. Serial No. 28,435. (No specimens.)

*To all whom it may concern:*

Be it known that we, CHARLES GABRIEL SUDRE, residing at 12 Boulevard St. Marcel, and CHARLES VICTOR THIERRY, residing at 11 Rue Meynadier, Paris, France, citizens of the French Republic, have invented a new and useful Process of Treating Distillers' Wash, of which the following is a specification.

Our invention relates to a process of treating the spent residues or wash of the distillation of wine, molasses, grains, beet-root, potatoes, and other substances which have undergone an alcoholic fermentation with a view to extracting from them gases and vapors containing such products as glycerin, nitrated substances, ammonias, tars, and mineral salts.

Our process pertains to that class of treatments by which the residues are submitted to the action of heat, but differs from the known processes by essential features, which will be pointed out.

The great difficulty dealt with in the old processes consists in the producing by the action of the heat, and especially when combined with the action of a vacuum, of such a quantity of gases and vapors, swelling, and scum of the treated mass of residues that the further conduct of the operation becomes impossible. According to our present invention we employ means whereby this swelling and scum is prevented from interfering with the carrying out of the heating process and whereby the process becomes continuous.

It is well known that according to some methods the previously-concentrated washes, preferably neutralized with lime, are heated either under atmospheric-air pressure or in a more or less complete vacuum and in a closed vessel, progressively or not, up to the calcining temperature, so as to disengage in a gaseous state and to be able to collect the nitrated substances, the glycerin, and the tars and to keep the mineral salts as a residue of the operation. In carrying out our invention we proceed also in this manner; but we cause the mass to be treated to flow in its plastic or heavy condition in the form of a thin sheet onto (or to assume the form of a thin sheet when on) a traveling endless band or table or revolving cylinder, circular revolving table, or other similar apparatus which is contained in a closed and heated chamber preferably connected with a vacuum-producer.

The accompanying drawings illustrate diagrammatically some forms of apparatuses by which to carry out our process.

Figure 1 is a diagrammatic side view, partly in section, of apparatus for carrying out our invention. Fig. 2 is a diagrammatic side view of a modification. Fig. 3 shows diagrammatically a cylinder instead of an apron, and Fig. 4 shows a horizontal circular plate to receive the thin layer of wash.

From a reservoir or tank A, Fig. 1, containing the concentrated and neutralized spent residues or wash the latter flows through a pipe B into a closed chamber C onto an endless conveyer D, passing around the cylinder E, which impart a continuous movement to it. The mass thus spread out in sheet form on the conveyer moves slowly and gradually forward and is subjected to the action of a temperature of 200° to 250° centigrade, applied in any suitable manner—as, for example, by means of a system of pipes F, containing heated steam. If desired, jets of steam emitted by pipes G may be directed toward the mass, and thus assist the disengagement of the glycerin. By means of a pipe H (shown broken away for convenience) a partial vacuum may, if required, be made in the chamber C, whereby the ammonias, glycerin, and tars evolved from the mass may be drawn off and afterward separated in any suitable manner. On its arrival at the end of the conveyer and when the greater part of the gases have been given off the mass now in a condition of pulverulency is removed by a scraper I, a circular brush J, or other similar means and falls onto a second endless conveyer K, which carries it to a space where a calcinating temperature of about 500° to 600° centigrade prevails, supplied by any suitable means, and evolves the remainder of the gases (ammonias and tars) contained in the said mass. From this second conveyer the mass may be carried in any suitable manner to a space where a low temperature prevails, so as to cool down the mass previous to the latter being brought out into the open air.

Of course the top C' of the chamber C must be at a sufficient distance above the mass of matter in sheet form being treated to allow of its bubbling and scumming freely.

In general the bubbles and scum extend upward to a distance of about thirty times the thickness of the sheet of matter being treated.

It may be stated that with our system the height reached by the bubbles and scum remain constantly the same.

When large quantities of spent residues or wash are to be treated, several endless conveyers may be arranged one under another, as shown in Fig. 2, each conveyer being provided with a separate feed-pipe and brush or scraper. A single calcinating-conveyer receives the wash from all the other conveyers.

Instead of conveying the pulverulent mass to be calcinated it may be allowed to fall direct to the heated bottom of the chamber, whence it is conveyed to the issue by an endless chain provided with scrapers or other propulsion devices.

Instead of using an endless traveling conveyer the wash may be caused to run in a thin sheet direct onto a large revolving cylinder, Fig. 3, whence it is caused to fall by a scraper onto the calcinating-surface. Likewise the sheet of spent residues may be made to run onto a horizontal circular plate, revolving around an axis or spindle, (shown in plan view in Fig. 4,) there being a series of such plates superposed one above another, each plate being provided with a brush or scraper to cause the pulverulent mass to fall onto the calcinated surface.

From what precedes without enumerating equivalents it will be easily understood that our invention consists, essentially, in treating the concentrated wash in a syrupous and plastic state, not in the compact form of a block, but, on the contrary, in the form of one or several thin sheets spread out on an endless supporting traveling surface, which receives the mass at the point where it is formed into a thin sheet and then carries it through spaces in which prevail temperatures which are suitable to the treatment.

Not only does our system avoid all the difficulties due to bubbling and scumming, but it also renders the operation continuous, and thus allows of treating in a comparatively small apparatus very large quantities of wash, and at the same time it requires much less expense in the matter of plant, manual labor, fuel, and the like, the running of the apparatus, when once properly adjusted, no longer depending on more or less incompetent attendants.

The word "sheet," as used above is taken in its widest sense and must be understood to mean, whatever the transversal section given to the stream in which the mass of wash flows or runs, the said steam as soon as it is sufficiently feeble in transversal section to avoid the objectionable effects of the bubbling and scumming.

We claim—

The process herein described of treating the spent residues or wash of distilleries, which consists in concentrating said wash to a syrupous or plastic state, subjecting said concentrated wash in the form of a moving thin sheet to a temperature of 200° to 250° centigrade under exclusion of air, separating the evolved gases, and then subjecting a moving thin sheet of the pulverulent residue to a temperature of from 500° to 600° centigrade under exclusion of air and separating the evolved gases.

In testimony whereof we have signed our names to this specification in the presence of two subscribing witnesses.

CHARLES GABRIEL SUDRE.
CHARLES VICTOR THIERRY.

Witnesses:
MICHEL T. THIERRY,
EDWARD P. MACLEAN.